(12) United States Patent
Carames et al.

(10) Patent No.: US 11,696,118 B2
(45) Date of Patent: *Jul. 4, 2023

(54) SYSTEM AND METHODS FOR NETWORK CONTROL OF 5G OPERATION MODE

(71) Applicant: Verizon Patent and Licensing Inc., Basking Ridge, NJ (US)

(72) Inventors: Miguel A. Carames, Long Valley, NJ (US); Sudhakar Reddy Patil, Flower Mound, TX (US); David E. Fitzgerald, Rockaway, NJ (US); Jignesh S. Panchal, Hillsborough, NJ (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/491,697

(22) Filed: Oct. 1, 2021

(65) Prior Publication Data

US 2022/0030417 A1 Jan. 27, 2022

Related U.S. Application Data

(63) Continuation of application No. 16/937,832, filed on Jul. 24, 2020, now Pat. No. 11,166,153.

(51) Int. Cl.
| | |
|---|---|
| *H04W 8/22* | (2009.01) |
| *H04W 28/24* | (2009.01) |
| *H04W 36/00* | (2009.01) |
| *H04W 4/70* | (2018.01) |
| *H04W 72/52* | (2023.01) |

(52) U.S. Cl.
CPC ............. *H04W 8/22* (2013.01); *H04W 4/70* (2018.02); *H04W 28/24* (2013.01); *H04W 36/0022* (2013.01); *H04W 72/52* (2023.01)

(58) Field of Classification Search
CPC ......... H04W 8/22; H04W 4/70; H04W 28/24; H04W 36/0022; H04W 72/0486
USPC ....... 370/331, 329, 328, 338, 341, 345, 350; 455/436, 442
See application file for complete search history.

(56) References Cited

U.S. PATENT DOCUMENTS

| | | | |
|---|---|---|---|
| 10,172,009 B1 | 1/2019 | Altay et al. | |
| 10,575,321 B1 | 2/2020 | Wiatrowski et al. | |
| 10,805,823 B2 | 10/2020 | Dhanapal et al. | |
| 11,166,153 B1 * | 11/2021 | Carames | H04W 36/0022 |
| 2011/0170517 A1 * | 7/2011 | Bakker | H04W 36/125 370/328 |

(Continued)

*Primary Examiner* — Nghi H Ly

(57) ABSTRACT

Systems and methods provide for network-based selection of a UE device's 5G operation mode. A network device in a wireless core network receives a policy query for a user equipment (UE) device. The UE device is capable of 5G non-standalone (NSA) and 5G standalone (SA) operation modes. The network device identifies one or more of subscription data for the UE device, stored network data associated with the UE device, or dynamic network data relevant to the UE device. The network device assigns, based on the identifying, a radio access technology/frequency selection and prioritization (RFSP) value for the UE device. The network device sends the RFSP value to an access management function in the wireless core network for controlling selection of the 5G NSA operation mode or 5G SA operation mode.

20 Claims, 12 Drawing Sheets

(56) References Cited

U.S. PATENT DOCUMENTS

| | | | |
|---|---|---|---|
| 2013/0029708 A1* | 1/2013 | Fox | H04W 40/24 |
| | | | 455/517 |
| 2016/0183156 A1* | 6/2016 | Chin | H04W 36/38 |
| | | | 370/331 |
| 2020/0288324 A1 | 9/2020 | Ford et al. | |

* cited by examiner

SYSTEM AND METHODS FOR NETWORK CONTROL OF 5G OPERATION MODE

BACKGROUND INFORMATION

This application is a continuation of U.S. patent application Ser. No. 16/937,832, filed on Jul. 24, 2020, and titled "System and Methods for Network Control of 5G Operation Mode," the contents of which are incorporated herein by reference.

BACKGROUND INFORMATION

The design and deployment of radio access networks (RAN) and core networks present certain challenges from a network-side perspective and an end device perspective. Fifth Generation (5G) networks, for example, may use different frequencies, different radio access technologies (RATs), and different core network functions that can provide an improved experience over current or legacy wireless networks (e.g., Fourth Generation (4G) networks). However, the transition from such systems to 5G networks may require network service providers to concurrently support users of older technologies and users of the new systems within the limits of the available wireless spectrum. This can present challenges to the service providers, as some configurations at both the network-side and end device-side may reduce the effective use of network resources.

DETAILED DESCRIPTION OF PREFERRED EMBODIMENTS

Figure 1:
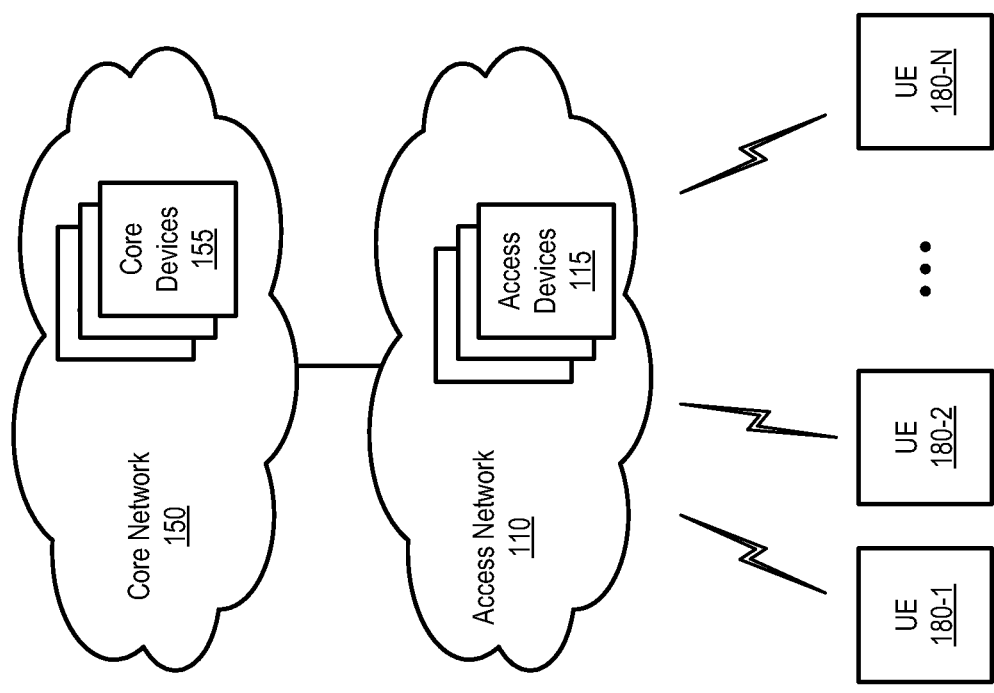
FIG. 1 is a diagram illustrating an exemplary multi-RAT environment in which systems and methods described herein may be implemented.

The following detailed description refers to the accompanying drawings. The same reference numbers in different drawings identify the same or similar elements. Also, the following detailed description does not limit the invention.

A Fifth Generation (5G) new radio (NR) network may provide standalone (SA) and non-standalone (NSA) configurations. For an NSA configuration, a Long Term Evolution (LTE) Evolved Packet Core (EPC) may be used together with other components of a 5G network; and for a SA configuration, a Next Generation Core (NGC) network may be used (NGC may also be referred to as a 5th Generation Core (5GC)). For NSA service, an LTE sub-6 cell (e.g., frequencies below 6 Gigahertz (GHz)) may be an anchor cell (e.g., Master Cell Group (MCG)) that provides all control signaling, and a NR band (e.g., using higher frequencies, such as millimeter wave (mmWave) frequencies) may be used for a secondary cell (e.g., Secondary Cell Group (SCG)) that provides (different or additional) data service. For SA service, a NR band may provide all control signaling and data service.

Initial 5G deployments will utilize the NSA operation mode (which may include "Option 3X" as defined by standardizing bodies). In Option 3X, the 5G NR RAN connects to the Evolved Packet Core. Over time, operators will move towards the SA architecture (also referred to as "Option 2" as defined by standardizing bodies). The move to SA enables full realization of many of the features promised by 5G network technology, such as network slicing, increased security, ultra-reliable low latency communication (URLLC), industrial automation use cases, private network enhancements, etc.

For a user equipment (UE) device to acquire wireless service of a network, the UE device has to first establish a wireless connection (e.g., a Radio Resource Control (RRC) connection) with a radio access network (RAN), and may authenticate, register, and establish a bearer with a core network. UE devices may be configured to support one or more operation modes for 5G networks, such as SA and/or NSA. UE devices may also be configured to priority scan SA mode and, if the mode is found, attach to 5G network on the SA mode. Currently, UE devices are expected to signal their capabilities (e.g. features supported, frequency bands supported, operation modes supported, etc.) to the provider network during the initial attach procedure.

Current network standards do not provide guidance as to which operation mode (SA or NSA) should be supported and/or attached first when both are possible in a given network (or portion of a network) for a particular UE device. Based on the signaled capabilities and/or configured priority mode (e.g., SA mode over NSA) of a UE device, the network would simply allow the UE device to connect in the highest operation mode (e.g., SA mode), assuming a frequency band supporting SA mode is available at the current UE device location.

Radio frequency bands that support 5G networks may vary. However, for example, a 5G network may include certain categories of radio frequency bands, such as those above 6 GHz and below 6 GHz, as well as other nomenclatures, such as sub-3 (e.g., below 3 GHz), mid-band (e.g., between 3 GHz and 6 GHz), low band, mmWave, and so forth. Regardless of the nomenclatures or categories, using higher frequency bands typically incurs larger propagation loss. In addition, uplink (UL) and downlink (DL) coverage areas at mid-band frequencies may be significantly different. For example, UL coverage may be smaller than DL coverage due to transmit power and receiver capability differences (e.g., antenna array, noise figure, etc.) between a UE device and a RAN device (e.g., evolved Node B (eNB), next generation Node B (gNB), etc.).

As service providers plan 5G deployments, Sub-6 and mmWave bands may initially be used for NSA. As 5G networks are being deployed, mmWave bands and a few selected low bands may be enabled to support SA mode. As 5G networks continue to expand in the future, mid-band (also referred to as C-band) may be deployed in SA mode.

Moreover, in the future, there may be a need for different network behaviors for different types of UE device using low bands. For example, IoT devices or telematics devices may require SA mode support in low bands (e.g., to enjoy low latency services and ubiquitous coverage). As another example, a service provider may prefer to have dual NSA- and SA-capable smartphones operate in NSA mode in low bands to benefit from NSA dual connectivity with high capacity LTE layers. Thus, there is a need for a network-based mechanism to select and control when a UE-device should be allowed to attach in SA or NSA mode based on certain aspects. This network-based control can vary from market (i.e., location) to market and/or from device/user to user.

Systems and methods described herein provide for network-based selection of a UE device's 5G operation mode. According to an implementation, the systems and methods may overrule a default selection of the highest operation mode signaled by the UE device and/or configured on the UE device when the UE device reports its capabilities. For example, a service provider may decide that NSA mode will provide a better user experience than SA mode for a UE device that is capable of both SA and NSA modes.

According to implementations described herein, the network decisions for a UE device's operating mode may take into account policy considerations such as (a) geographical location of a UE device, (b) frequency bands available at the UE device's location, (c) traffic load in an area, (d) subscription parameters, such as services supported, quality of service (QoS) requirements, and past service mean opinion score (MOS) measurements. According to another implementation, a policy may take into account other factors, such as provisioned attributes, use cases, historical network performance data, and/or network capabilities provisional attributes.

FIG. 1 is a diagram of an exemplary multi-RAT environment 100 in which the systems and/or methods, described herein, may be implemented. As illustrated, environment 100 includes an access network 110 and a core network 150. Access network 110 includes access devices 115, and core network 150 includes core devices 155. Environment 100 further includes UE devices 180-1 through 180-N (collectively referred to herein as UE devices 180).

The number, the type, and the arrangement of devices in access network 110 and core network 150, as illustrated and described, are exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between devices. Environment 100 may be implemented to include wired, optical, and/or wireless communication links among the network devices and the networks illustrated. A communication link may be direct or indirect. For example, an indirect communication link may involve an intermediary device and/or an intermediary network (not illustrated in FIG. 1). A direct communication link may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of selecting a 5G operation mode may use at least one of these planes of communication. Additionally, an interface of a network device may be implemented differently from standard interfaces (e.g., an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices (e.g., access devices 115 and/or core devices 155), as described herein. According to various exemplary implementations, the interface may be a service-based interface or a reference point-based interface.

Access network 110 may include multiple networks of multiple types and technologies. For example, access network 110 may include a 4G RAN, a 4.5G RAN, a 5G RAN, and/or another type of future generation RAN. By way of further example, access network 110 may be implemented to include an Evolved UMTS Terrestrial Radio Access Network (E-UTRAN) of a LTE network, an LTE-Advanced (LTE-A) network, and/or an LTE-A Pro network, and a next generation (NG) RAN. Access network 110 may further include other types of wireless networks, such as a WiFi network, a Worldwide Interoperability for Microwave Access (WiMAX) network, a local area network (LAN), or another type of network (e.g., a legacy Third Generation (3G) RAN, etc.) that may provide an on-ramp to access devices 115 and/or core network 150.

According to various exemplary embodiments, access network 110 may be implemented to include various architectures associated with wireless services, such as, for example, macrocell, microcell, femtocell, picocell, metrocell, NR cell, LTE cell, non-cell, or another type of cell architecture. Additionally, according to various exemplary embodiments, access network 110 may be implemented according to various wireless technologies (e.g., RATs, etc.), wireless standards, wireless frequencies/bands/carriers, licensed radio spectrum, unlicensed radio spectrum, and/or other attributes of radio communication.

Access network 110 may include different and multiple functional splitting, such as options 1, 2, 3, 4, 5, 6, 7, or 8 that relate to combinations of different types of access network 110 and core network 150 including an EPC network and/or a NGC network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD, etc.), and/or another type of connectivity service.

Depending on the implementation, access network 110 may include one or multiple types of network devices, such as access devices 115. For example, access devices 115 may include an eNB, a gNB, an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. A "cell" may include a coverage area served by an access device 115 using a particular frequency band. Thus, in some cases, a cell and the access device servicing the cell may be referred to interchangeably. According to an exemplary embodiment, access device 115 includes logic that supports NSA and/or SA operation modes for 5G networks, as described herein.

Core network 150 may include multiple networks of multiple types and technologies. According to an exemplary embodiment, core network 150 includes a complementary network of access network 110. For example, core network 150 may be implemented to include an EPC of an LTE, a core network of an LTE-Advanced (LTE-A) network, and/or a core network of an LTE-A Pro network, and a next generation core (NGC) network. Core network 150 may also include a legacy core network.

Depending on the implementation, core network 150 may include various types of network devices, such as core devices 155. For example, core devices 155 may include a packet gateway (PGW), a serving gateway (SGW), a home subscriber server (HSS), an authentication, authorization, and accounting (AAA) server, a mobility management entity (MME), a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. As another example, core devices 155 may include combined functions, such as overlapping 4G/5G functions to support a NSA architecture. According to an exemplary embodiment, core device 155 includes logic that supports network selection of a 5G operation mode, as described herein.

UE device 180 includes a device that has computational and wireless communication capabilities. Depending on the implementation, UE device 180 may be a mobile device, a portable device, a stationary device, a device operated by a user, or a device not operated by a user. For example, UE device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, UE device 180 may be implemented as a smartphone, a personal digital assistant, a tablet, a netbook, a wearable device (e.g., a watch, glasses, etc.), a set top box, an infotainment system in a vehicle, a vehicle support system, a telematics system, a smart television, a game system, or other types of wireless end devices. UE device 180 may be configured to execute various types of software (e.g., applications, programs, etc.). The number and the types of software may vary among UE devices 180.

UE device 180 may support multiple RATs (e.g., 4G, 5G, future RAT, etc.) and various portions of the radio spectrum (e.g., multiple frequency bands, multiple carrier frequencies, licensed, unlicensed, etc.), network slicing, DC service, and/or other types of connectivity services. Additionally, UE device 180 may include one or multiple communication interfaces that provide one or multiple (e.g., simultaneous) connections via the same or different RATs, frequency bands, carriers, network slices, and so forth. The multimode capabilities may vary among UE devices 180. According to an exemplary embodiment, UE device 180 includes logic that enables network connectivity in NSA or SA operation mode, as described herein. According to exemplary embodiments, when UE device 180 supports both NSA or SA operation modes, access network 110 may apply policies to govern the selection of NSA or SA operation mode for the UE device 180. Thus, similar UE devices 180 may be directed into different operation modes (e.g., NSA or SA) by access network 110 depending, for example on network policy designs.

Figure 2:
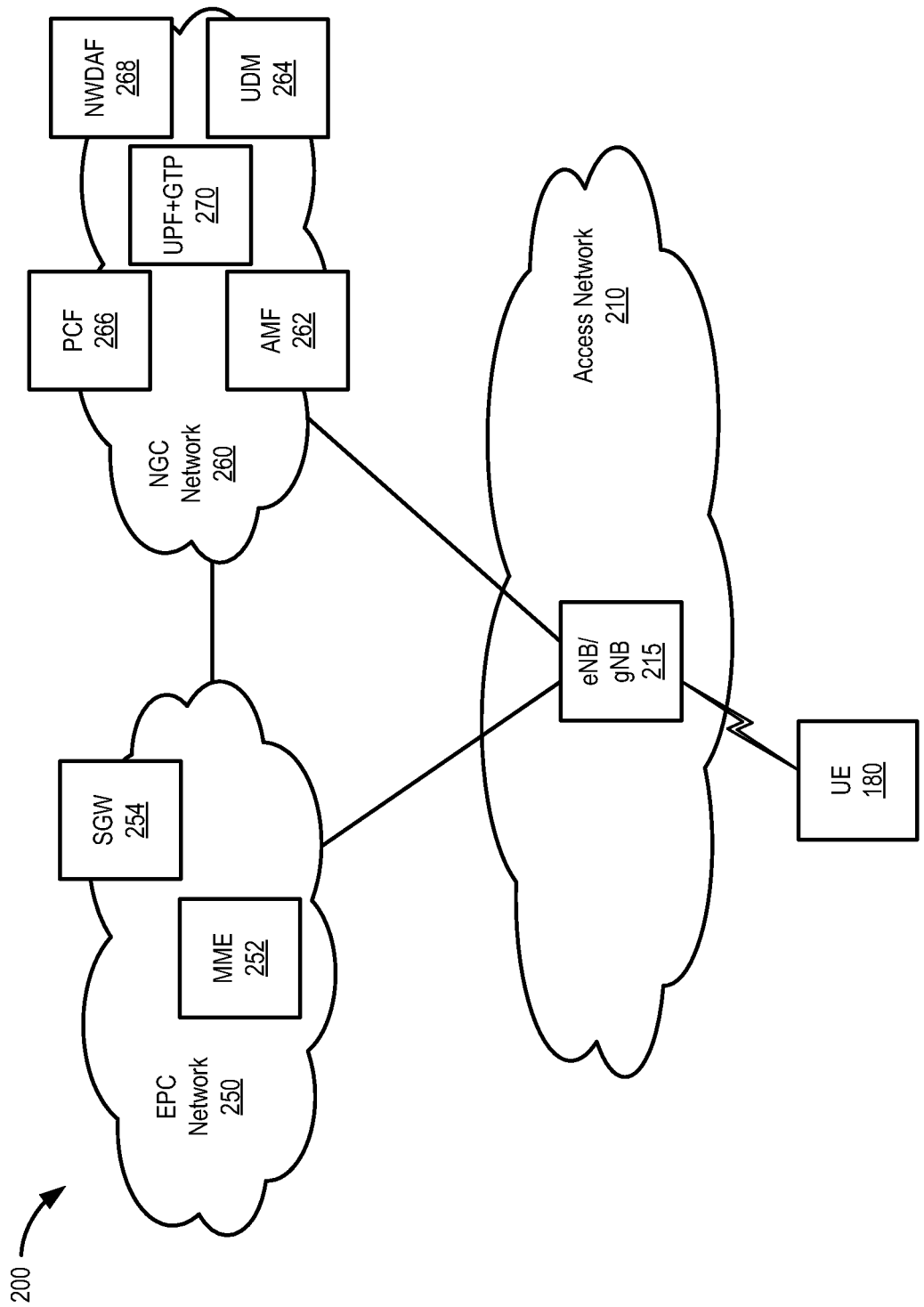
FIG. 2 is a diagram illustrating exemplary network elements for selection of a 5G operation mode in the multi-RAT environment of FIG. 1.

FIG. 2 is a diagram illustrating exemplary network elements for selection of a 5G operation mode in a portion 200 of multi-RAT environment 100. As illustrated, network portion 200 includes UE device 180, an access network 210, an EPC network 250, and a NGC network 260. Access network 210 includes a combined eNB/gNB 215. EPC network 250 includes an MME 252 and a SGW 254; and NGC network 260 includes an AMF 262, a UDM 264, a PCF 266, a network data analytics function (NWDAF) 268, and a combined UPF with General Packet Radio Service (GPRS) Tunneling Protocol (GTP) device 270. As previously described in relation to environment 100, the number of network devices, the type of network devices, the communication links, and so forth, in network portion 200 are exemplary.

Combined eNB/gNB 215 may include a network device and other components that allow UE device 180 to wirelessly connect to access EPC network 250 and NGC network 260 via access network 210. According to the implementation of FIG. 2, for NSA operations eNB/gNBs 215 may use portions of the lower frequency bands that are part of (but distinct from) the lower frequency bands allocated for LTE communications. For example, in one implementation, eNB/gNBs 215 may be configured to allocate portions of a spectrum (e.g., Band 2, 1900 PCS) for 4G and 5G connections. In another implementation, eNB/gNBs 215 may support SA operations using mmWave frequencies. In one implementation, eNB/gNBs 215 may interface with EPC network 250 via a Diameter S1 interface and interface with NGC network 260 via an N3 interface. Functions of MME 252, SGW 254; AMF 262, UDM 264, PCF 266, NWDAF 268, and UPF+GTP device 270 are described further in connection with, for example, FIGS. 3A-3D.

FIGS. 3A-3D are diagrams illustrating exemplary communications in portion 300 of network environment 100 for performing network selection of a 5G operation mode. As illustrated, network portion 300 includes UE device 180, access network 210, EPC network 250, and NGC network 260. Access network 210 includes a combined eNB/gNB 215, EPC network 250 includes MME 252, and NGC network 260 includes AMF 262, UDM 264, PCF 266, and NWDAF 268.

Figure 3A:
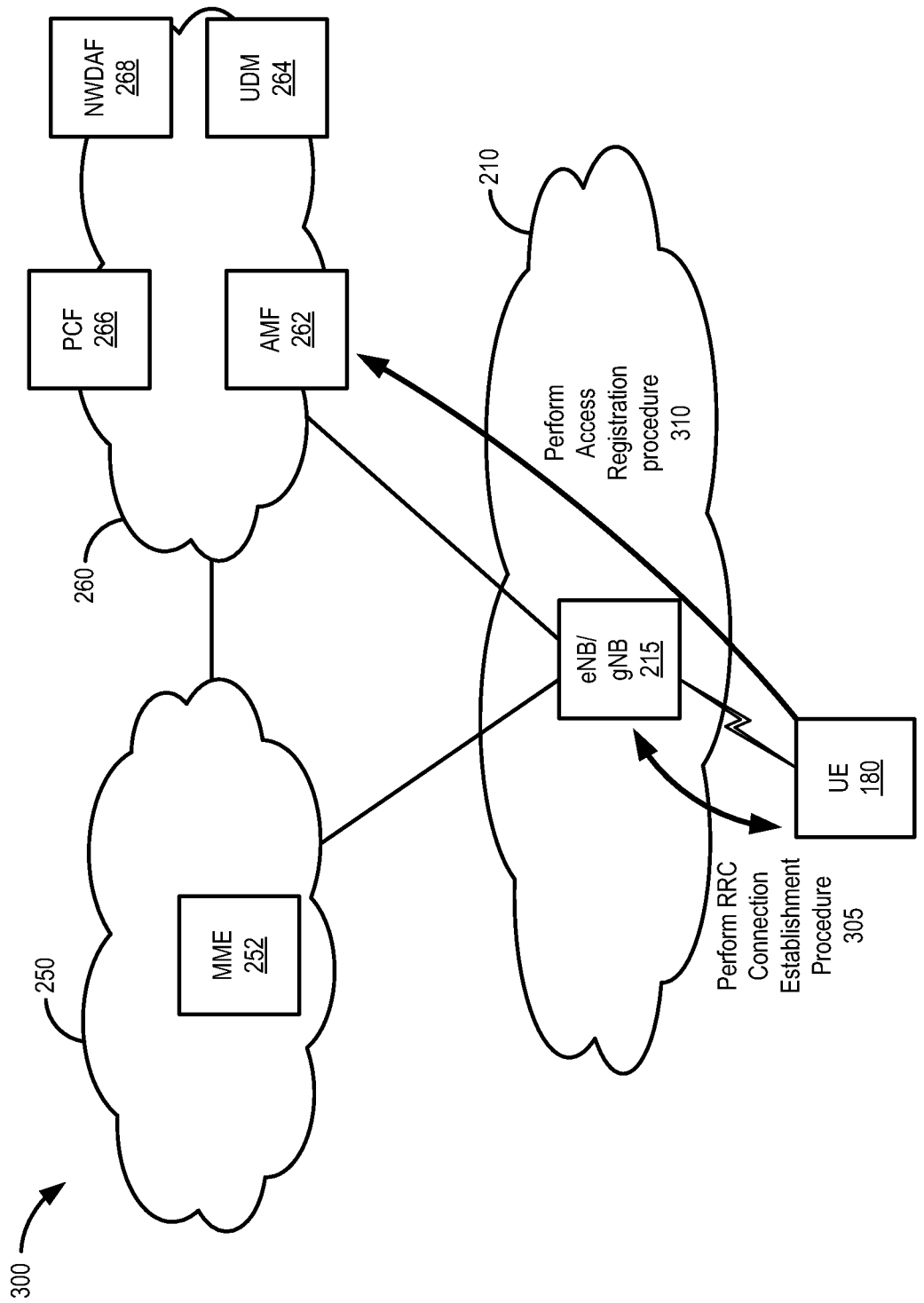
FIGS. 3A-3D are diagrams illustrating exemplary communications for network selection of a 5G operation mode.

Referring to FIG. 3A, according to an exemplary scenario, assume that UE device 180 establishes a radio resource control (RRC) connection with eNB/gNBs 215 based on an RRC Connection Establishment procedure 305. Subsequently, UE device 180 and NGC network 260 may perform an access registration procedure 310.

Figure 3B:
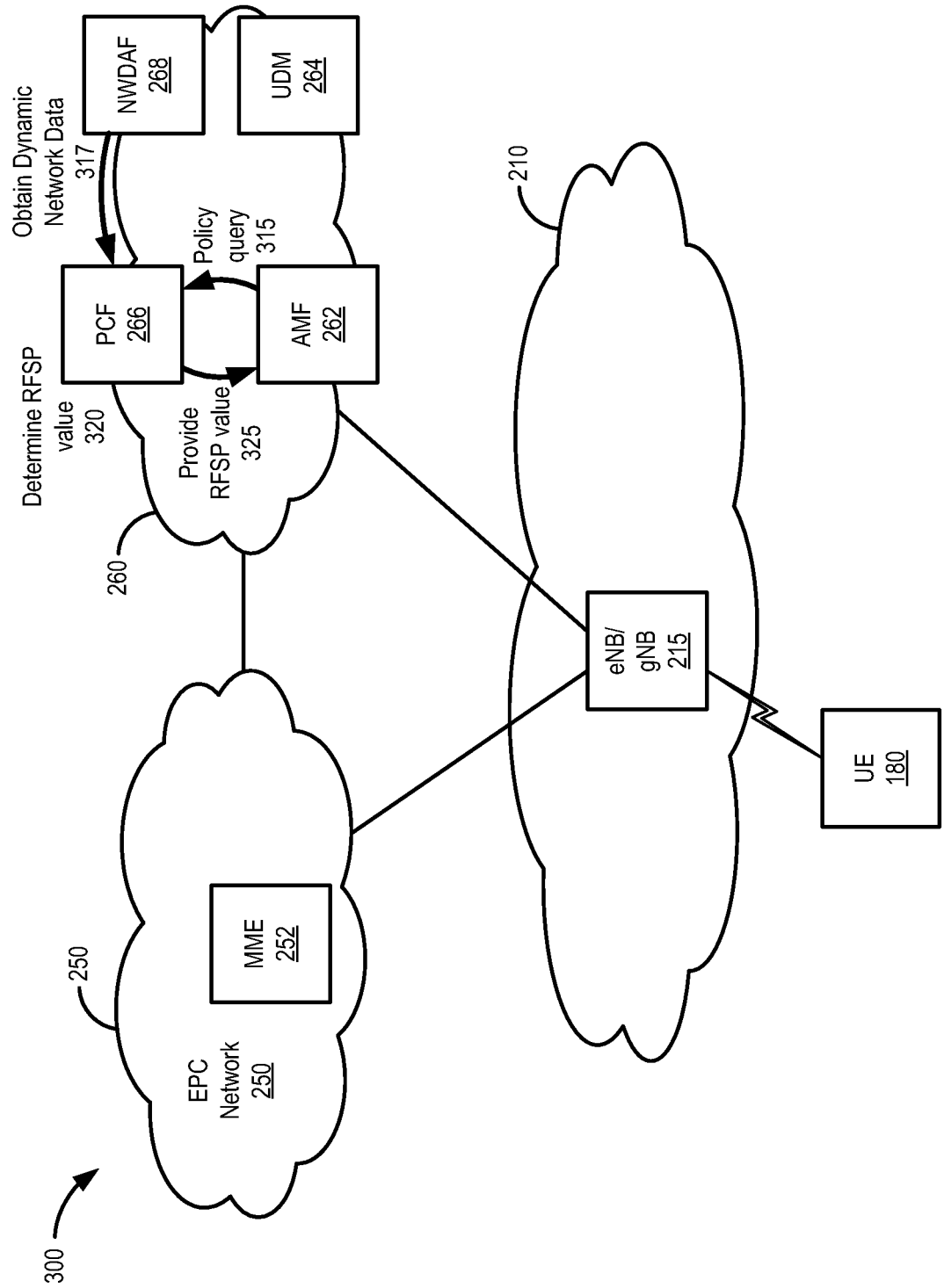

Referring to FIG. 3B, according to one implementation, during access registration procedure 310, AMF 262 may provide to PCF 266 a policy query 315 pertaining to UE device 180. A binding service function (BSF, not shown) may assist AMF 262 in establishing communication with PCF 266. Policy query 315 may request access management policies for UE device 180 or, more specifically, policy query 315 may request a 5G operation mode policy for UE device 180. Policy query 315 may request, for example, information about operation mode capabilities of UE device (e.g., NSA and/or SA). According to an implementation, policy query 315 may be included in existing call flows configured for AMF and PCF interaction.

Based on policy query 315, PCF 266 may apply a 5G operation mode selection model to determine whether or not to override UE device capability information (e.g., SA and NSA 5G operation modes) when network conditions would otherwise permit SA operation mode. In one implementation, PCF 266 may dynamically apply the 5G operation mode selection model by collecting stored subscription data for UE device 180, stored network data relevant to UE device 180, and/or dynamic network data relevant to UE device 180. The stored subscription data and the stored network data may be maintained, for example, in a local memory of PCF 266. As indicated at reference 317, PCF 266 may obtain the current network data via a subscription with NWDAF 268.

As indicated at reference 320, PCF 266 may apply the stored subscription data, the stored network data, and/or the dynamic network data to the 5G operation mode selection model to dynamically assign a RAT/Frequency Selection and Prioritization (RFSP) value for UE device 180. The RFSP value may include an index value indicating a preferred 5G mode for UE device 180. For example, the index value may indicate that UE device 180 is SA capable, and another index value may indicate that UE device 180 is NSA capable. Policy considerations applied by PCF 266 to determine the RFSP value are described further, for example, in connection with FIGS. 4B and 4C. PCF 266 may provide the determined RFSP value 325 to AMF 262 for propagation and implementation.

Figure 3C:
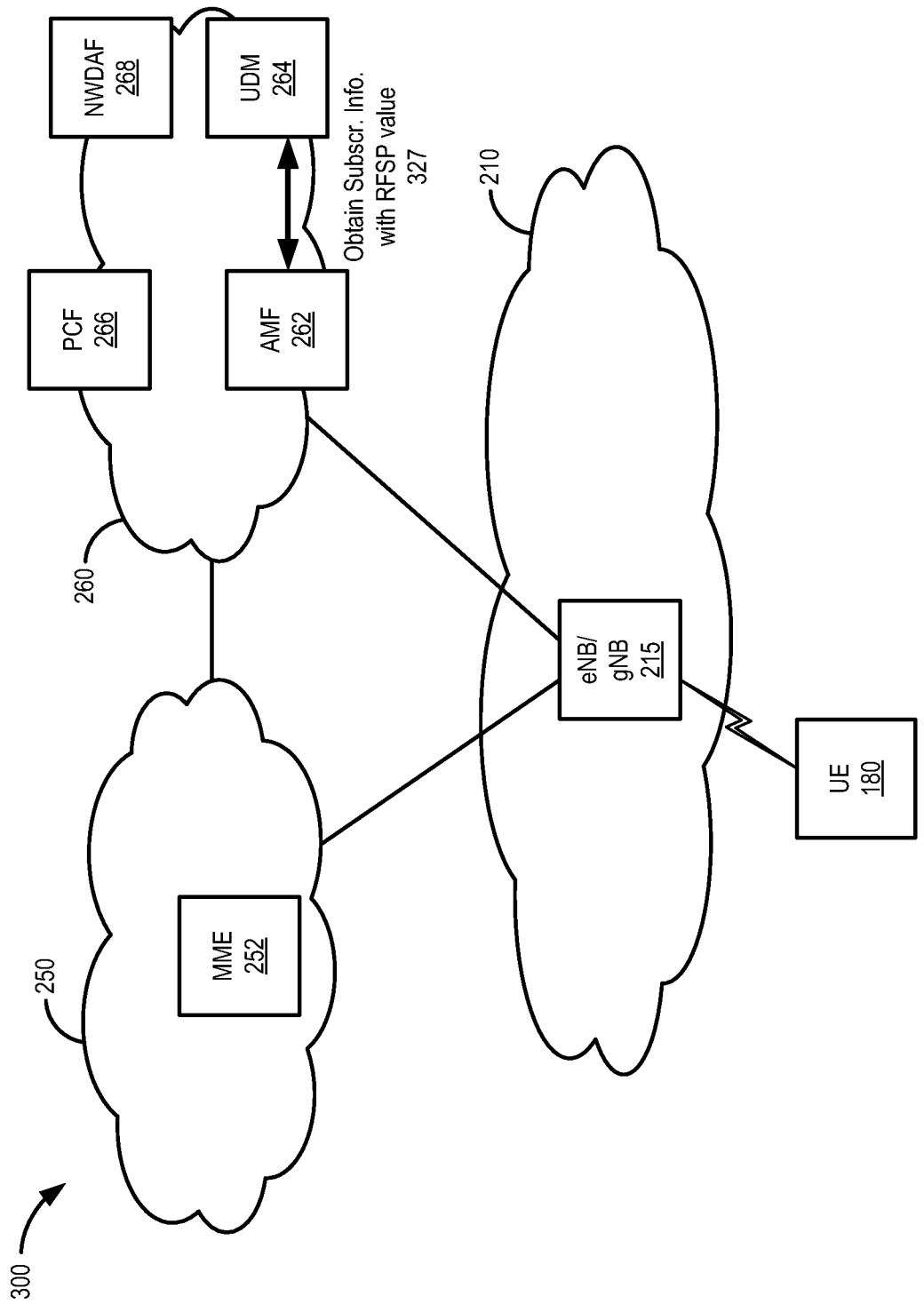

FIG. 3C provides an alternate set of communications to those of FIG. 3B. Referring to FIG. 3C, according to another implementation, during access registration procedure 310, AMF 262 may obtain, from UDM 264, subscription information 327 pertaining to UE device 180. Subscription information 327 may include a specific RFSP value corresponding to a subscription for UE device 180. For example, an RFSP value stored by UDM 264 may be preselected to correspond to a subscription category (e.g., IoT vs. consumer) or service type (e.g., Wireless Priority Service (WPS), E911, etc.) associated with UE device 180.

Figure 3D:
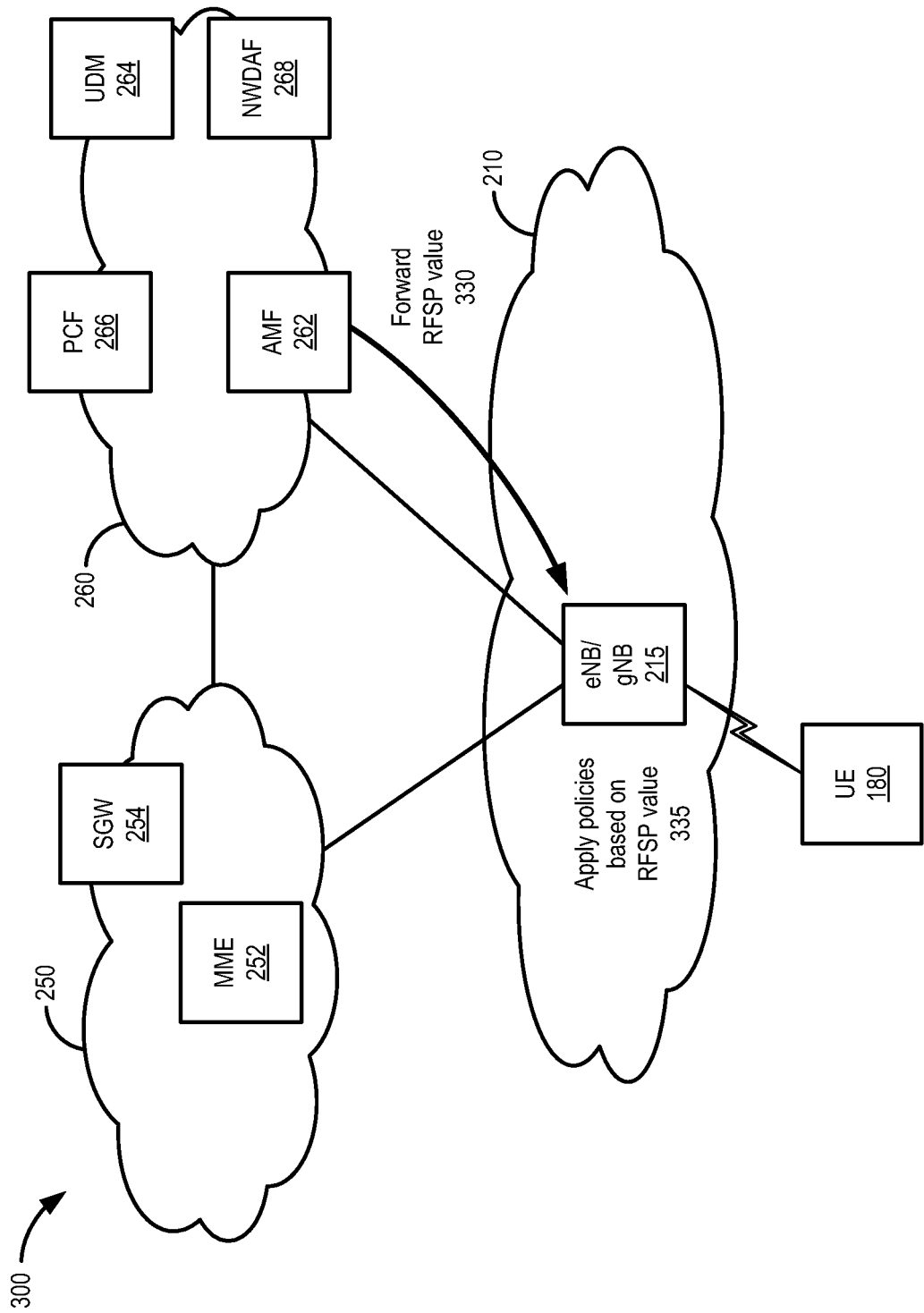

Referring to FIG. 3D, AMF 262 may receive the selected RFSP value from PCF 266 (e.g., RFSP value 325 of FIG. 3B) or the pre-designated RFSP value from UDM 264 (e.g., RFSP value 327 of FIG. 3C), depending on the implementation used in NGC network 260. AMF 262 may forward 330 the received RFSP value to eNB/gNBs 215. eNB/gNBs 215 and UE device 180 may apply corresponding policies based on the RFSP value. For example, RFSP information may be used to select a different AMF 262 if necessary, manage idle mode camping, and controlling of inter-RAT/inter-frequency handover while inactive mode.

FIGS. 3A-3D illustrate an exemplary process of network-based selection of a UE device's 5G operation mode. However, according to other exemplary embodiments, the process may include additional, different, and/or fewer steps, and/or include additional, different, and/or fewer messages.

Figure 4A:
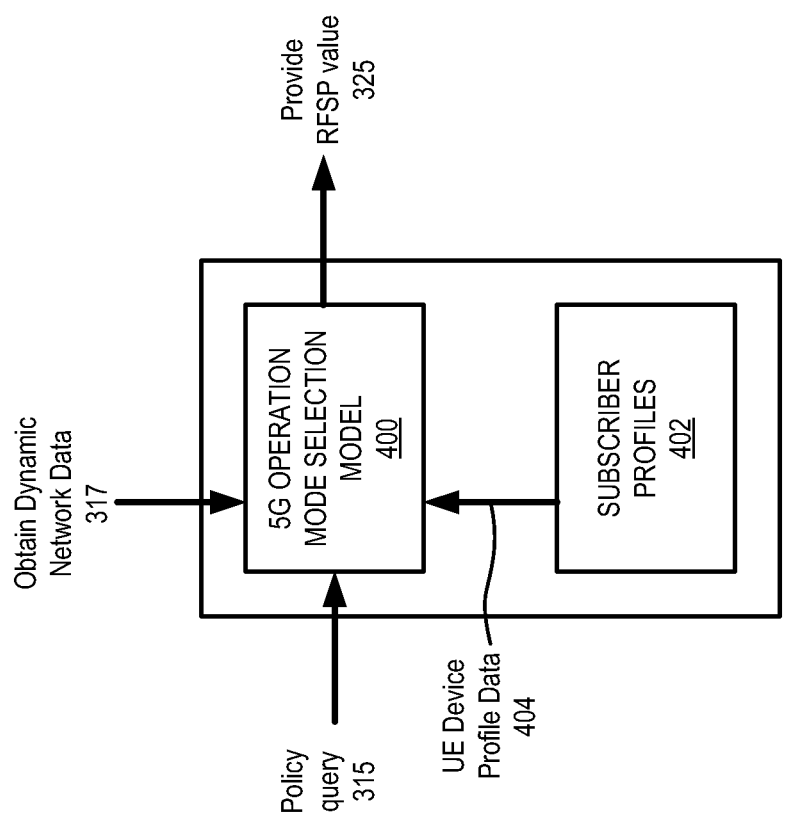
FIGS. 4A-4C are diagrams illustrating an exemplary embodiment of 5G operation mode selection data.
Figure 4B:
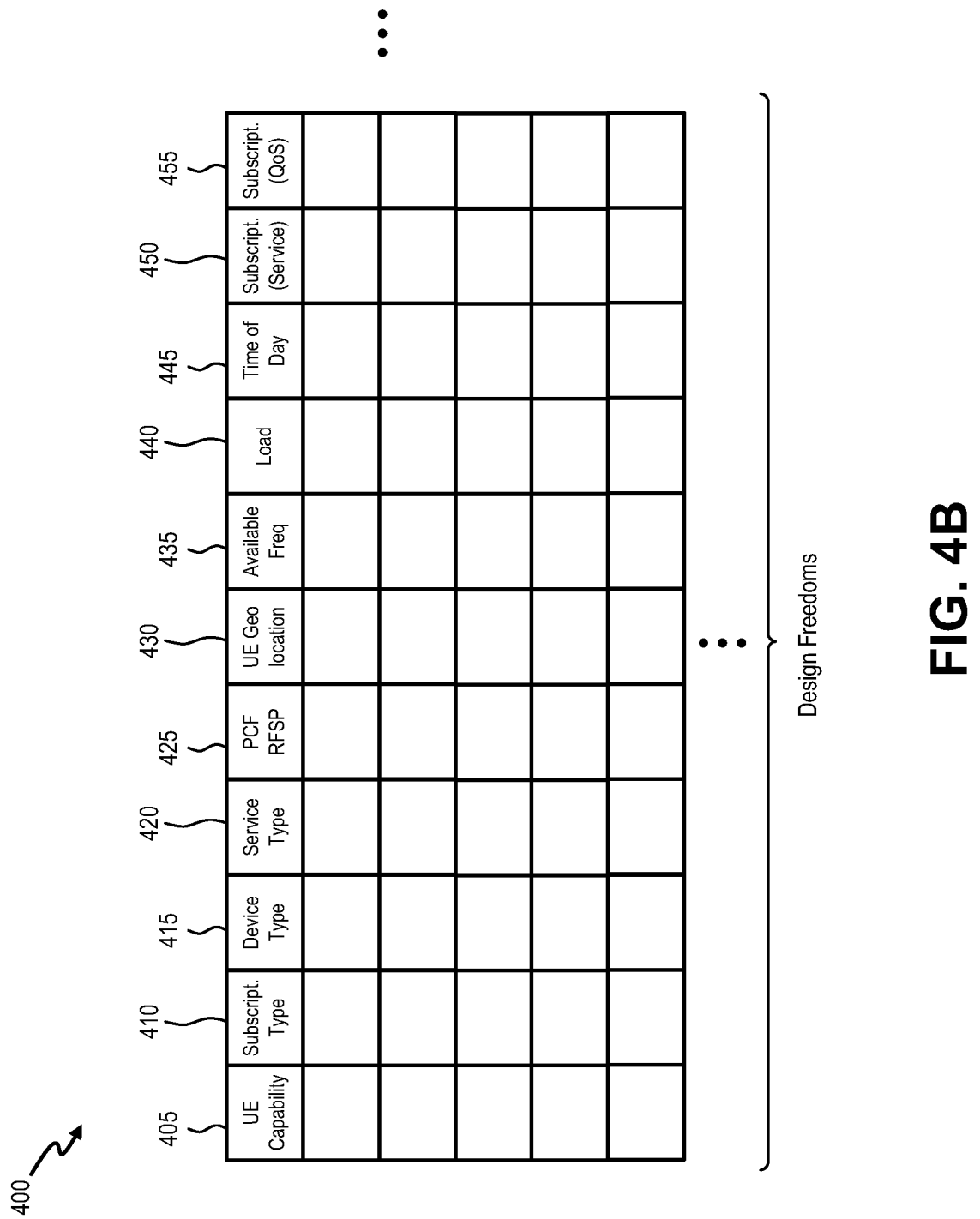
Figure 4C:
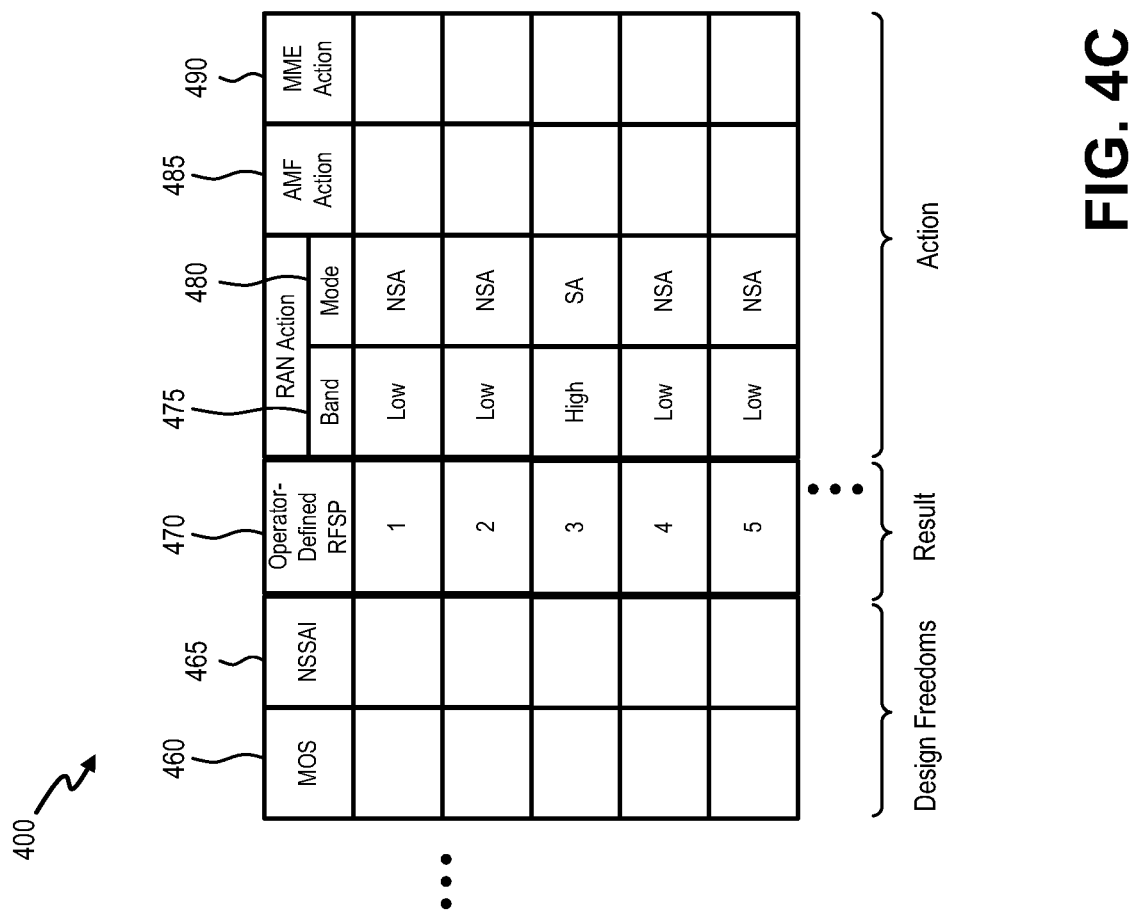

FIGS. 4A-4C are diagrams illustrating an exemplary embodiment of a 5G operation mode selection model 400 that may be applied, for example, by PCF 266. As shown in FIG. 4A, along with 5G operation mode selection model 400, PCF 266 may also store subscriber profiles 402. Subscriber profiles 402 may include subscriber data, subscription data, preferences, and policies associated with different UE devices 180. In addition to communications described above in connection with FIG. 3B, PCF 266 may also retrieve UE device profile data 404 in response to receiving policy query 315. Thus, PCF 260 may apply dynamic network data 317 (e.g., from NWDAF 268) and UE device profile data 404 to 5G operation mode selection model 400 to assign and provide RFSP value 325.

As shown in FIGS. 4B and 4C, selection model 400 may be in the form of a table that includes UE capability 405 field, a subscription type field 410, a device type field 415, a service type field 420, a PCF RFSP field 425, a UE geographic location field 430, an available frequency field 435, a load field 440, a time of day field 445, a subscription (service) field 450, a subscription (QoS) field 455, a mean opinion score (MOS) field 460, and a network slice selection assistance information (NSSAI) field 465. Each of fields 405-465 may represent design parameters that can be weighted or applied to determine a network assigned RFSP value for a particular UE. The 5G operation mode selection model 400 is presented in the form of a table in FIGS. 4B and 4C for illustration purposes. In other implementations, a different data format may be used for model 400.

Referring to FIG. 4B, UE capability field 405 may include operation mode capabilities information for a UE device 180. Generally, for purposes of 5G operation mode selection, UE capabilities may include both SA and NSA. Subscription type field 410 may include a subscription type information associated with UE device 180. The subscription types may include, for example, consumer and IoT, where consumer subscriptions may weigh toward using an available SA band, while IoT subscriptions may weigh toward using an NSA band.

Device type field 415 may include information indicating a type of UE device 180, such as a smartphone, a fixed wireless device, a telematics device, an IoT device, etc. Service type field 420 may include information indicating a service type designated by a subscription or use case. Service type filed 420 may distinguish, for example, between WPS, emergency service, conventional data sessions, etc.

PCF RFSP field 425 may include a default RFSP value for UE device 180. The default RFSP value may signal to the RAN which radio management strategies/polices should be used for a particular UE (e.g., scheduling priority, preference of certain bands over another, etc.). UE geographic location field 430 may include a current geographic location (e.g., in real time) of UE device 180. Geographic location information may include, for example, a tracking area ID (TAI), an E-UTRAN cell global identifier (ECGI), or another location parameter.

Available frequency field 435 may include a list of available frequency bands for the current location specified in UE geographic location field 430. Bands in available frequency field 435 may include, for example, bands (or combinations of bands) to support NSA and/or SA operation modes. According to an implementation, available frequency bands may be pre-provisioned information that can be determined, for example, based on cross-reference to a current TAI or ECGI.

Load field 440 may include a traffic load rating for bands specified in frequency field 435 (e.g., and associated with an area identifier from UE geographic location field 430). Values in load field 440 may be expressed as a capacity percentage, a threshold indication (e.g., low, medium, high), or an available bandwidth value. In one implementation, values in load field 440 may be supplied to PCF 266, for example, by NWDAF 268 and updated in real time. In another implementation, values in load field 440 may include load projections obtained, for example, from a network data module (e.g., NWDAF 268).

Time of day field 445 may include time window information and corresponding load projections for cells associated with UE device 180. For example, a time of day of an RRC connection may be correlated to projection period with a low, medium, or high traffic load.

Subscription (service) field 450 may include a list of services or service parameters to be supported for a subscription associated with UE device 180. Services may include, for example, data only, voice and data, etc. Subscription (QoS) field 455 may include a quality of service information associated with a subscription. Parameters for subscription (service) field 450 and subscription (QoS) field 455 may be available to PCF 266, for example, from stored subscriber policies.

Referring to FIG. 4C, MOS field 460 may include past service MOS measurements. The MOS measurements may correspond to a particular time of day, geographic area, and/or frequency bands associated with UE device 180. According to another implementation, MOS field 460 may include an expected/predicted MOS value. In one implementation, values in MOS field 460 may be supplied to PCF 266, for example, from a network data module (e.g., NWDAF 268).

NSSAI field 465 may include an indication of whether network slice selection assistance information has been requested by UE device 180. The NSSAI may indicate the services and/or characteristics required by an application being executed on UE device 180. A UE device's request for network slicing, for example, may weigh in favor of using SA operation mode, if network slicing is available in NSA mode.

As described above, PCF 266, for example, may apply values in fields 405-465 to determine a resulting network-selected RFSP value for UE device 180. According to an implementation, PCF 266 may match values for a current UE 180 to fields 405-465 to determine a corresponding value in an operator-defined RFSP field 470. In one implementation, PCF 266 may identify a best fit of fields 405-465 to determine a value for RFSP field 470. In another implementation, one or more of fields 405-465 may be weighted to trump other RFSP selection criteria.

In still other implementations, a combination of provisional attributes (e.g., subscription type), historical network performance data (e.g., NSA to SA jitter), network capabilities (e.g., number of frequency bands with Dynamic Spectrum Sharing (DSS) enabled in a given geographical footprint, typical carrier aggregation capability across deployed bands in NSA vs SA modes, number and density of gNBs SA-enabled in a given geographical footprint, etc.).

Selection of a value from operator-defined RFSP field 470 may direct particular policy actions by RAN 210, AMF 262, and/or MME 252. For example, as shown in fields 475 and 480, values in operator-defined RFSP field 470 may correspond to a particular band (e.g., low, medium, high) and operation mode (e.g., NSA or SA) for UE device 180. Application of a selected value from operator-defined RFSP field 470 may also direct actions by AMF 262 and MME 252, as indicated in AMF action field 485 and MME action field 490, respectively.

Although model 400 shows 13 design freedoms that may be applied to determine an operator-defined RFSP value, in other implementations, model 400 may include additional or fewer design parameters than those illustrated. Furthermore, PCF 266, for example, may apply one of several selection techniques to determine the operator-defined RFSP value from the design freedoms in model 400. For example, machine learning and/or artificial intelligence may be used to perform an RFSP selection or determine weight values for one or more of fields 405-465. In another implementation, model 400 may not include dynamic network data. For example, model 400 may be applied by UDM 264 to match UE device type information to a designated RFSP value in field 470. Furthermore, fields 475-490 are shown for descriptive purposes and may not be used by PCF 266 to select an RFSP value.

Figure 5:
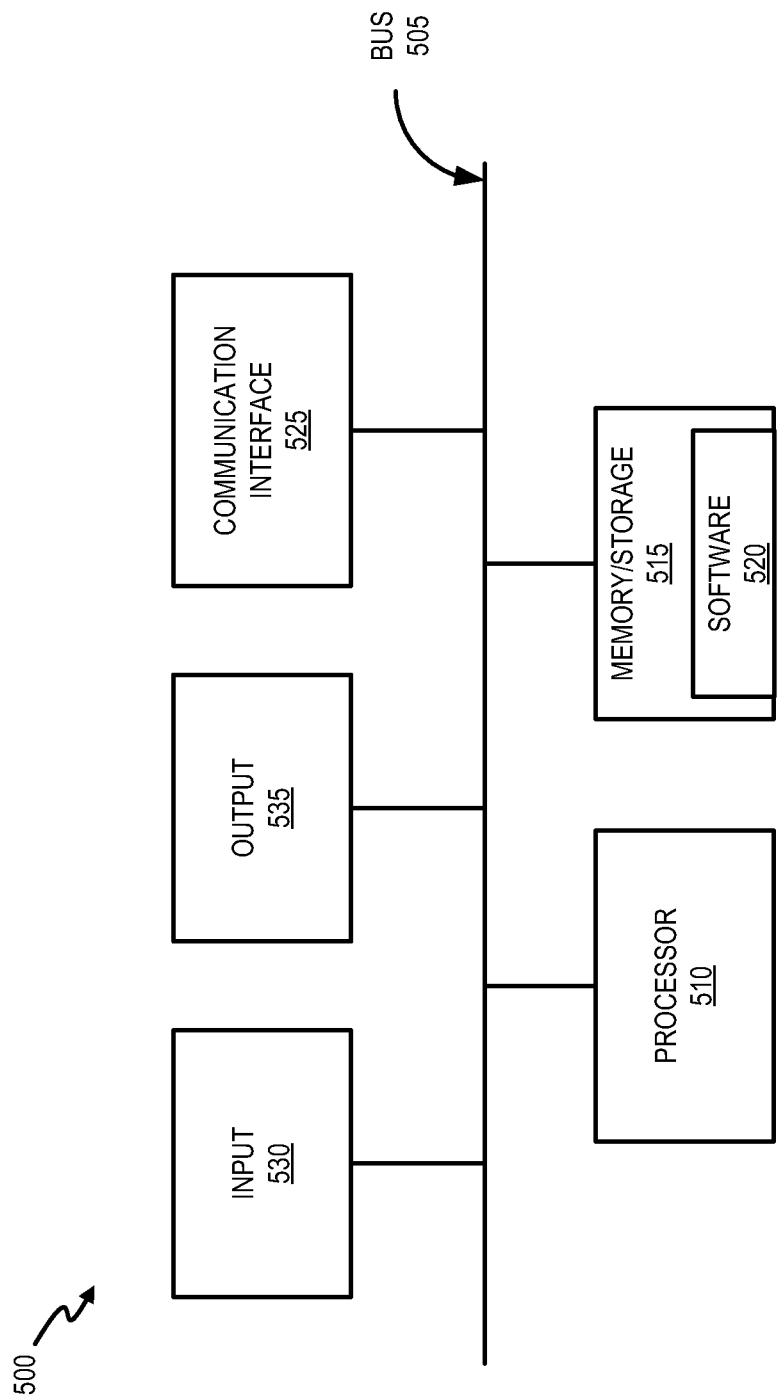
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to components included in access devices 115, core devices 155, UE device 180, eNB/gNB 215, MME 252, SGW 254, AMF 262, UDM 264, PCF 266, and UPF+GTP 268. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with respect to access device 115 (e.g., eNB/gNB 215, etc.), software 520 may include an application that, when executed by processor 510, provides a function to enforce network-based selection of a UE device's 5G operation mode, as described herein. Additionally, with reference to a network device of a core network (e.g., UDM 264, PCF 266, etc.), software 520 may include an application that, when executed by processor 510, provides a function to select a UE device's 5G operation mode, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, spun up, spun down, or undergo a life-cycle, using well-known virtualization techniques in a public/private cloud or other type of network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
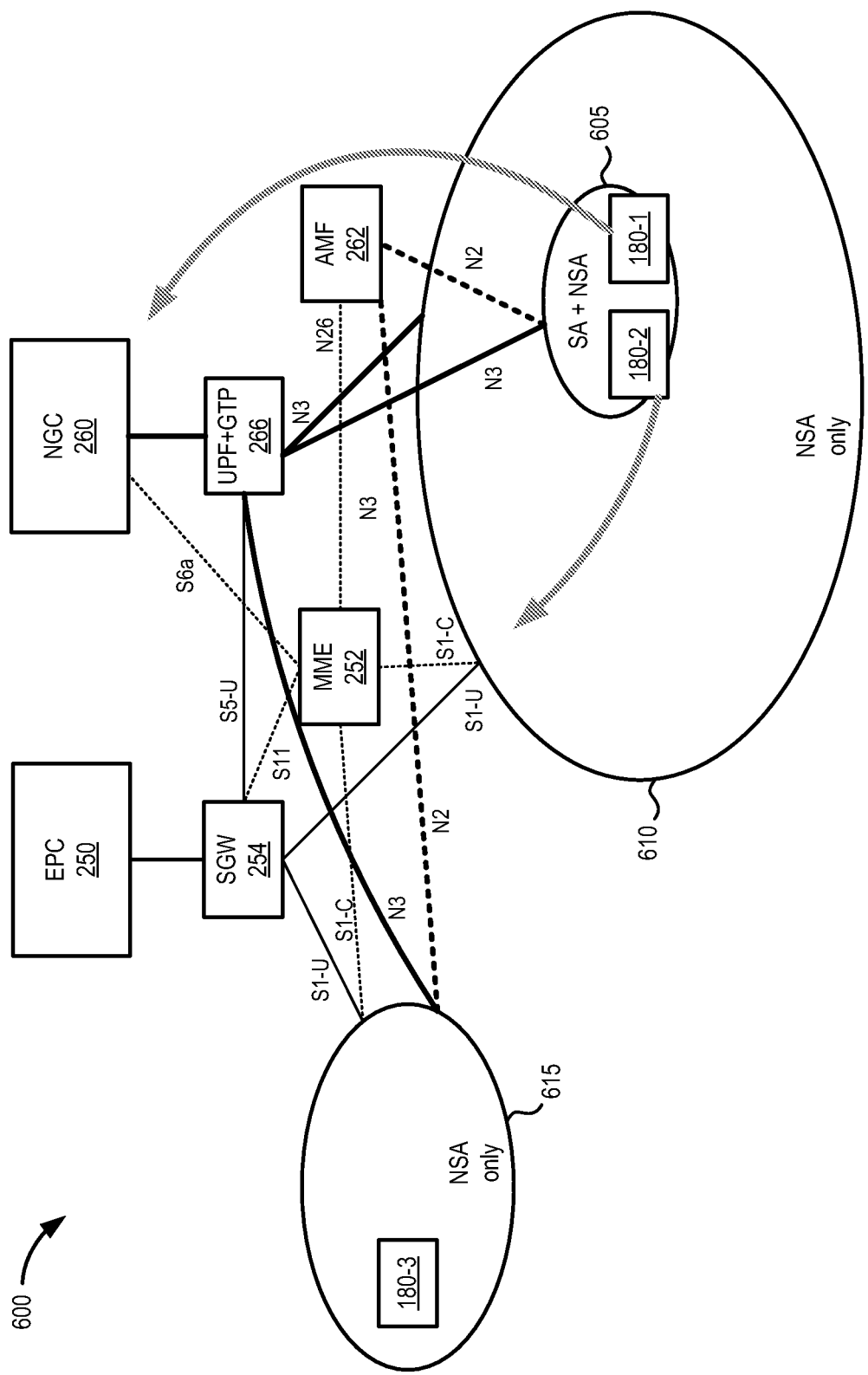
FIG. 6 is a diagram illustrating a use case for network selection of a 5G operation mode.

FIG. 6 is an illustration of a use case for network-based selection of a UE device's 5G operation mode in a portion 600 of network environment 100. Network portion 600 may include a 5G cell 605 that supports both SA and NSA modes, a 5G NSA cell 610, and a 5G NSA cell 615. Cell 605 is located within cell 610. End devices 180-1, 108-2, and 180-3 are dual-mode UEs, capable of operating in either SA or NSA mode. In the example, of FIG. 6, assume UE device 180-1 is a fixed wireless device (e.g., a wireless hot spot), UE device 180-2 is an IoT device, and 180-3 is a consumer's smart phone.

In the example of FIG. 6, both UE device 180-1 and 180-2 may be located within the coverage area of cell 605 and report dual capabilities. Based on RFSP values selected by PCF 266 (not shown), AMF 262 may direct UE device 180-1 to use an SA frequency band (e.g., mmWave frequency) for cell 605. Accordingly, UE device 180-1 may communicate with NGC core 260 via 5G standalone infrastructure. Conversely, again based on RFSP values selected by PCF 266, AMF 262 may direct UE device 180-2 to use an NSA frequency band for cell 610. Accordingly, UE device 180-2 may communicate with NGC core 260 via 5G non-standalone infrastructure even though UE device 180-2 may be otherwise configured to use 5G standalone resources. UE device 180-3, which is located in a cell 615 that only supports NSA operation mode, would not be subject to network overruling of a 5G operation mode, since only NSA is available in cell 615.

Figure 7:
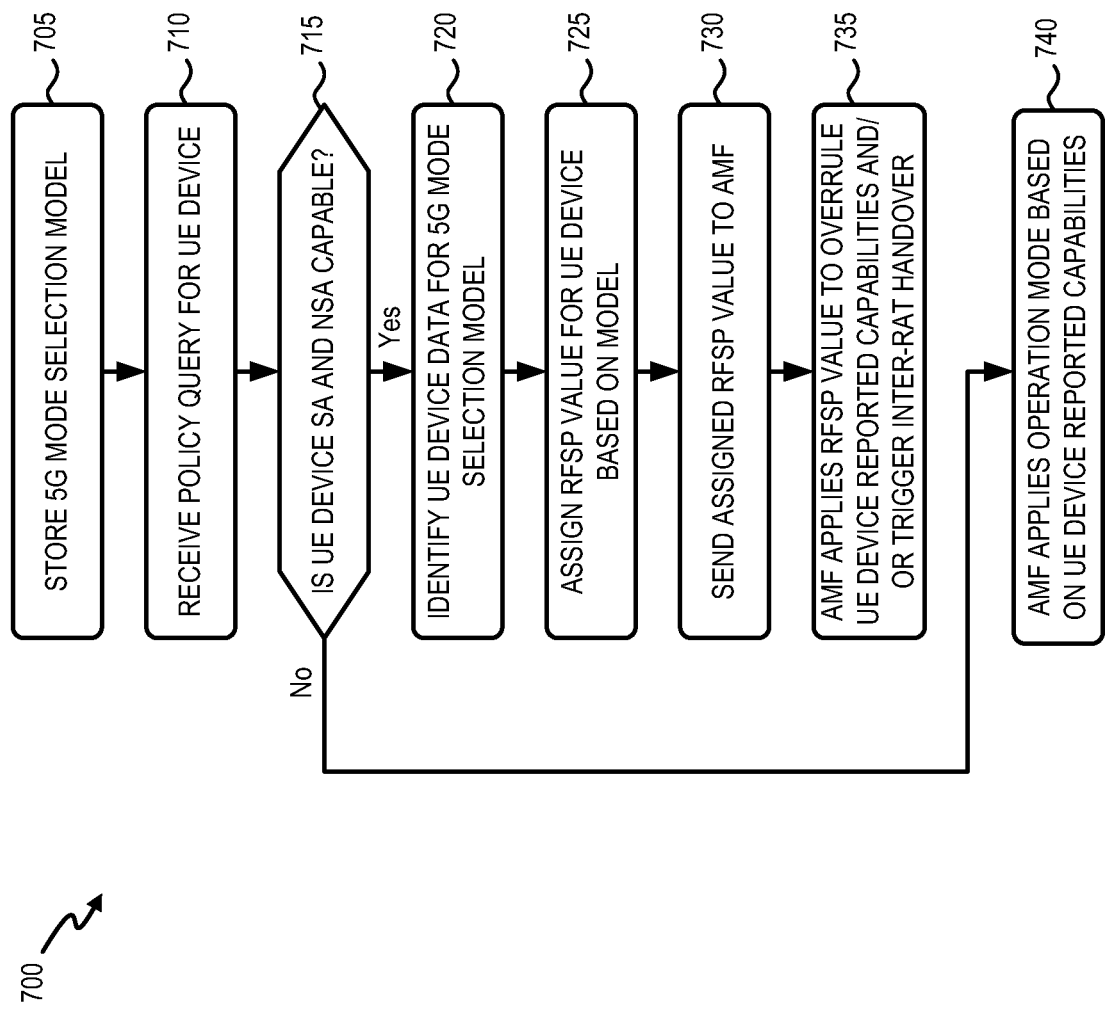
FIG. 7 is a diagram illustrating a process for performing network selection of a 5G operation mode.

FIG. 7 is a flow diagram of a process 700 for performing network-based selection of a UE device's 5G operation mode. According to an exemplary embodiment, a network device of a NGC network performs steps of process 700. For example, the network device may be PCF. According to another embodiment, a PCF, AMF, and/or access device (e.g., gNB/eNB 215) may performs steps of process 700. Additionally, for example, processor 510 may execute software 520 to perform a step illustrated in FIG. 7 and described herein. Additionally, or alternatively, a step illustrated in FIG. 7 may be performed by only hardware.

Process 700 may include storing a 5G mode selection model (block 705), receiving an access query for a UE device (block 710), and determining if the UE device is SA and NSA capable (block 715). For example, PCF 266 may be configured with 5G operation mode selection model 400. As part of an initial attachment procedure or another network communication process, AMF 262 may provide to PCF 266 a policy query pertaining to UE device 180. PCF 266 may use a UE identifier in the policy query and device capability information (e.g., from the policy query or from a stored subscriber profile) to determine if UE device 180 has both SA and NSA capability.

If the UE device is both SA and NSA capable (block 715—Yes), process 700 may include identifying UE device data for the 5G selection model (block 720) and assigning an RFSP value for the UE device based on the model (block 725). For example, PCF 266 may retrieve data from subscriber profiles 402 and NWDAF 268 to use in 5G operation mode selection model 400. Based on the model output, PCF 266 may select a RFSP value (e.g., from operator-defined RFSP field 470).

Process 700 may also include sending the assigned RFSP value to an AMF (block 730), and applying the assigned RFSP value to overrule UE device-reported capabilities and/or trigger an inter-RAT handover (block 735). For example, PCF 266 may provide the determined RFSP value to AMF 262 for propagation and implementation. AMF 262 may receive the selected RFSP value and forward the received RFSP value to a corresponding eNB/gNB 215. According to one implementation, the RFSP value may trigger an inter-RAT handover process for UE device 180. For example, a UE device 180 that is capable of both SA and NSA mode may be currently attached to network in SA mode (e.g., due to UE device default selection or other initial attachment data). In that case, UE device 180 may be forced to be moved to an appropriate NSA mode through an inter-RAT handover process based on the RFSP value communicated to AMF 262 and eNB/gNB 215.

If the UE device is not both SA and NSA capable (block 715—No), process 700 may include applying an operation mode based on the UE device reported capabilities (block 740). For example, PCF 266 will not evaluate whether to overrule a UE device's operation mode when only both SA and NSA mode capabilities are not available to UE device 180.

Systems and methods provide for network-based selection of a UE device's 5G operation mode. A network device in a wireless core network receives an access request for a UE device. The UE device is capable of 5G NSA and 5G SA operation modes. The network device identifies one or more of subscription data for the UE device, stored network data associated with the UE device, or dynamic network data relevant to the UE device and assigns, based on the identifying, a RFSP value for the UE device. The network device sends the RFSP value to an access management function in the wireless core network for controlling selection of the 5G NSA operation mode or 5G SA operation mode.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. Various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signals and blocks have been described with regard to the processes illustrated in FIGS. 3A-3D, and 7, the order of the signals and blocks may be modified according to other embodiments. Further, non-dependent signals or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory 515.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
receiving, by a network device, user equipment (UE) device capability information indicating a UE device is capable of a non-standalone (NSA) operation mode and a standalone (SA) operation mode;
generating, by the network device, a policy query for the UE device;
receiving, by the network device and in response to the policy query, a radio access technology/frequency selection and prioritization (RFSP) value for the UE device; and
sending, by the network device and to an access device, the RFSP value, wherein the RFSP value overrules a UE device default selection of the NSA operation mode or the SA operation mode.

2. The method of claim 1, further comprising:
assigning, in response to the policy query, the RFSP value for the UE device.

3. The method of claim 2, where assigning the RFSP value further comprises:
applying a 5G operation mode selection model to one or more of:
a stored subscriber profile for the UE device,
stored network data associated with the UE device, or
dynamic network data relevant to the UE device.

4. The method of claim 1, further comprising:
receiving, by the access device, the RFSP value; and
triggering, in response to receiving the RFSP value, an inter-radio access technology (RAT) handover of the UE device.

5. The method of claim 1, wherein the network device includes an access management function.

6. The method of claim 1, wherein receiving the RFSP value includes:
receiving the RFSP value from one of a policy control function (PCF) or a unified data management (UDM) device.

7. The method of claim 1, further comprising:
determining, by the network device, that the UE device is capable of the NSA operation mode and the SA operation mode.

8. The method of claim 1, wherein the SA operation mode uses a New Radio frequency band to provide all control signaling and data service for the UE device.

9. The method of claim 1, wherein the access device includes a combined evolved Node B (eNB) and next generation Node B (gNB).

10. A system, comprising:
a first network device including a first processor configured to:
receive user equipment (UE) device capability information indicating a UE device is capable of a non-standalone (NSA) operation mode and a standalone (SA) operation mode;
generate a policy query for the UE device;
receive, in response to the policy query, a radio access technology/frequency selection and prioritization (RFSP) value for the UE device; and
sending, to an access device, the RFSP value, wherein the RFSP value overrules a UE device default selection of the NSA operation mode or the SA operation mode.

11. The system of claim 10, further comprising:
a second network device including a second processor configured to:
assign, in response to the policy query, the RFSP value for the UE device.

12. The system of claim 11, wherein, when assigning the RFSP value, the second processor is further configured to:
apply a 5G operation mode selection model to one or more of:
a stored subscriber profile for the UE device,
stored network data associated with the UE device, or
dynamic network data relevant to the UE device.

13. The system of claim 11, wherein the second network device includes:
a policy control function (PCF), or
a unified data management (UDM) device.

14. The system of claim 10, further comprising:
the access device configured to:
receive the RFSP value; and
trigger, in response to receiving the RFSP value, an inter-radio access technology (RAT) handover of the UE device.

15. The system of claim 10, wherein the first network device comprises an access management function.

16. The system of claim 10, wherein the first processor is further configured to:
determine that the UE device is capable of the NSA operation mode and the SA operation mode.

17. The system of claim 10, wherein the access device includes a combined evolved Node B (eNB) and next generation Node B (gNB).

18. A non-transitory computer-readable medium containing instructions executable by at least one processor, the computer-readable medium comprising instructions for:
receiving user equipment (UE) device capability information indicating a UE device is capable of a non-standalone (NSA) operation mode and a standalone (SA) operation mode;
generating a policy query for the UE device;
receiving, in response to the policy query, a radio access technology/frequency selection and prioritization (RFSP) value for the UE device; and
sending, to an access device, the RFSP value, wherein the RFSP value overrules a UE device default selection of the NSA operation mode or the SA operation mode.

19. The non-transitory computer-readable medium of claim 18, wherein the instructions for receiving the RFSP value comprise instructions for:
receiving the RFSP value from one of a policy control function (PCF) or a unified data management (UDM) device.

20. The non-transitory computer-readable medium of claim 18, further comprising instructions for:
determining that the UE device is capable of the NSA operation mode and the SA operation mode.

* * * * *